United States Patent [19]

Balyasny

[11] Patent Number: 4,799,759
[45] Date of Patent: Jan. 24, 1989

[54] FIBER OPTIC CONNECTOR
[75] Inventor: Marik Balyasny, Van Nuys, Calif.
[73] Assignee: G & H Technology, Inc., Santa Monica, Calif.
[21] Appl. No.: 855,401
[22] Filed: Jun. 26, 1986
[51] Int. Cl.⁴ ............................................... G08B 6/38
[52] U.S. Cl. .............................. 350/96.21; 350/96.20
[58] Field of Search ............... 350/96.21, 96.18, 96.20, 350/96.22

[56] References Cited

U.S. PATENT DOCUMENTS

| | | | |
|---|---|---|---|
| 3,972,585 | 8/1976 | Dalgleish et al. | 350/96.21 |
| 4,181,402 | 1/1980 | Borsuk et al. | 350/96.21 |
| 4,279,467 | 7/1981 | Borsuk et al. | 350/96.21 |
| 4,304,461 | 12/1981 | Stewart et al. | 350/96.18 |

Primary Examiner—John Lee
Assistant Examiner—Michael Menz
Attorney, Agent, or Firm—George J. Netter

[57] ABSTRACT

A contact for an optical fiber has a ferrule onto one end of which a tip is releasably fitted. The end wall of the tip includes an opening of predetermined diameter within which a bare fiber of only very slightly less diameter is to located. The optical fiber with bare fiber end portion is received through the opposite end of the ferrule and the bare fiber end is located within the tip opening spaced inwardly from the tip end wall. The contact is received within a hollow tubular terminus body and extends out one end thereof, the remainder being retained within the terminus body by a flange on the ferrule. Additional parts terminate the fiber strength member externally of the contact and a spring provides axial resiliency to the contact. The tip outer end surface may have a concavity for receiving a spherical lens and a lens holder secures the lens against the tip end.

1 Claim, 2 Drawing Sheets

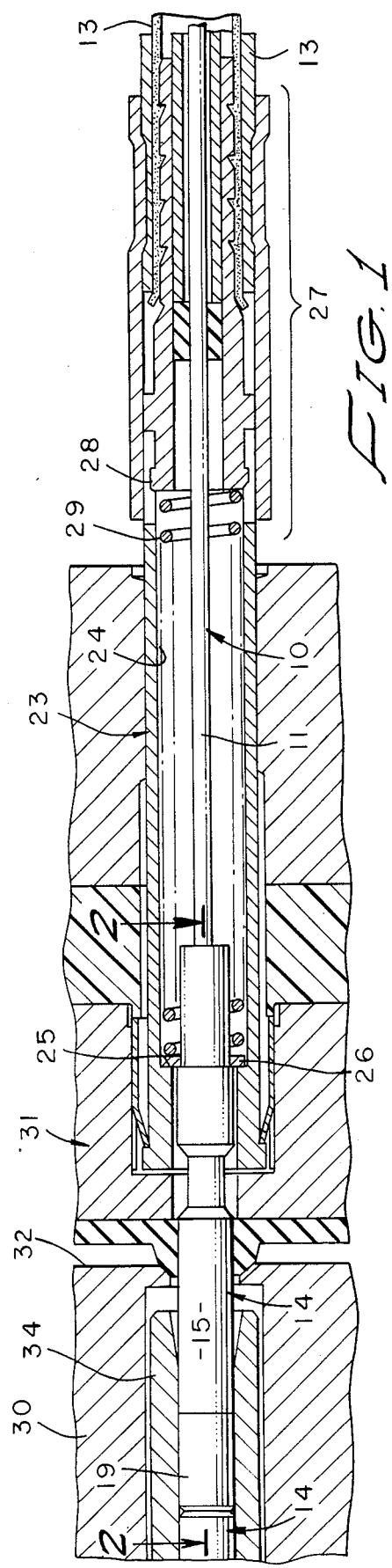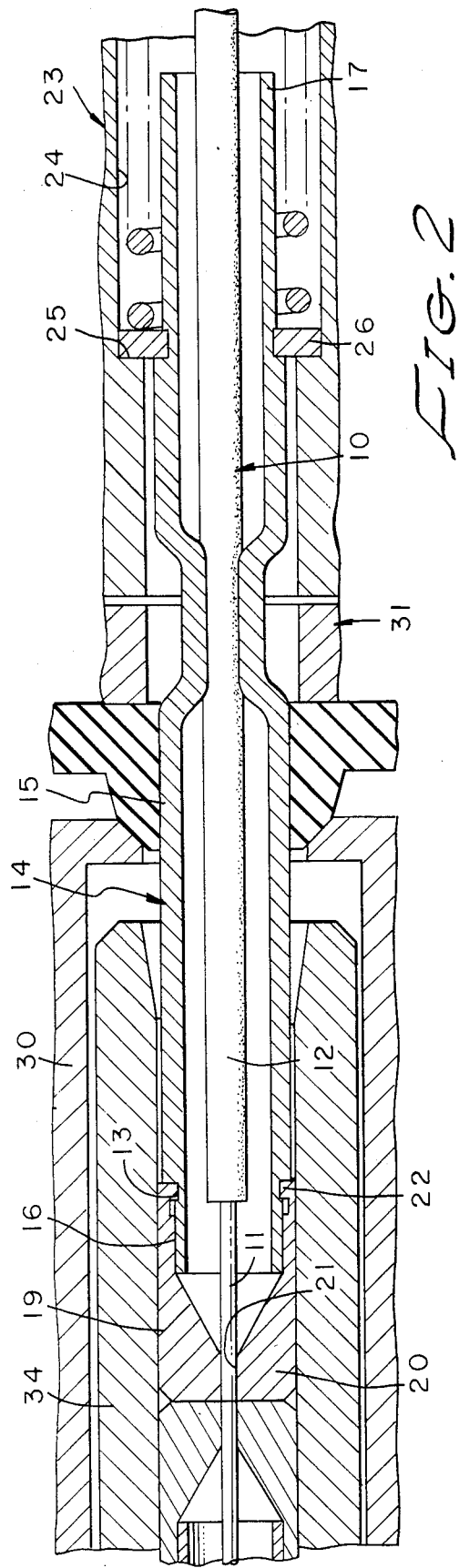

FIBER OPTIC CONNECTOR

The present invention relates generally to optical fiber contacts useful in joining pairs of optical fibers to provide highly efficient light signal transmission between the so connected pairs.

BACKGROUND OF THE INVENTION

It is known to arrange pairs of optical fibers relative to one another in a connector to enable light signals to be transmitted from one of the optical fibers to the other optical fiber. A connector part or contact for holding an optical fiber in such a connector must be precisely constructed in order to position the two bare end portions of the fibers to be connected in a very closely end spaced relation, namely, approximately 0.0002 inches. Still further, the facing ends of the two fibers should be cleaved very close to 90 degrees in order to prevent reflections which would reduce signal transmission efficiency. Still further, the spacing of the ends of the fibers is additionally important in that if the fibers contact one another, they may become broken, damaged, contaminated or misaligned and in that way severely impair light transmission.

Certain known optical fiber contacts are constructed as a one-piece ferrule having a precisely formed opening in a unitary end wall for receiving a bare optical fiber to be interconnected with another fiber. By the use of two such ferrule contacts located within a contact alignment means, the two fibers have their respective end faces appropriately located. Not only are these contacts difficult to make and expensive because of specific narrow applications, but contact is limited to a specific fiber size which would mean that a number of such ferrules would have to be provided with different openings to accommodate the different fiber sizes.

In addition to holding the fibers to be interconnected in a very slightly spaced relation as above described, it is also known to use one or more lenses located between a pair of optical fibers to be connected as a light transmission contact member between the fibers. In this case, there are still constraints regarding positioning and orientation of the fiber with respect to the lenses.

There are many situations in which it becomes necessary to provide an interconnection means for one or more pairs of fibers and to do this under field conditions. For example, this requirement may arise where an optical fiber in an existing cable has become broken. This may also occur during cable installation in order to join fiber cables which have been laid down at different points, or for example, to join fibers at a junction with other fiber cables coming from various locations. Therefore, simplicity of construction and ease of use are essential to insure establishing reliable and efficient fiber connections under field conditions.

OBJECTS AND SUMMARY OF THE DISCLOSURE

It is a primary aim and object of the present invention to provide an optical fiber connector including a contact of improved construction which reduces or substantially eliminates the difficulties of the kind noted hereinabove.

Another object is the provision of an optical fiber contact having a selectively replaceable part for adapting to different fiber diameters.

In the practice of the present invention, a contact for an optical fiber includes a hollow tube or ferrule onto one end of which a cap or tip is releasably fitted. The end wall of the tip includes an opening of predetermined diameter within which a bare fiber of only very slightly less diameter is to be located. In use, an optical fiber with a bare fiber end portion is received through the opposite end of the ferrule and the bare fiber end passes through the tip opening. The ferrule wall is then crimped at a convenient location to secure the ferrule about the fiber and positively position the bare fiber end. The bare fiber end is precisely cleaved at a point such that the faced-off fiber end lies within the tip opening slightly spaced from the tip outer surface.

Next, the contact is received within a hollow tubular terminus body and extends out one end thereof, the remainder being retained within the terminus body by a flange on the ferrule. Additional parts are interconnected with the opposite end of the terminus body for terminating the fiber strength member externally of the contact and in this way to provide strain relief for the fiber. An internal spring in the terminus member provides resiliency to the contact along the contact longitudinal axis.

In an alternative embodiment, the outer end surface of the contact tip is provided with a concavity for receiving a lens therein over which a lens holder fits securing the lens against the tip end. The above noted objects and features of the invention will be better understood on reference to the remainder of the specification and the drawing, wherein like reference numnerals are used to refer to like elements.

DESCRIPTION OF THE DRAWINGS

FIG. 1 is a side elevational, sectional view of the optical fiber connector of this invention.

FIG. 2 is a sectional, enlarged view taken along line 2—2 of FIG. 1.

DETAILED DESCRIPTION OF PREFERRED EMBODIMENTS

Figure 3:
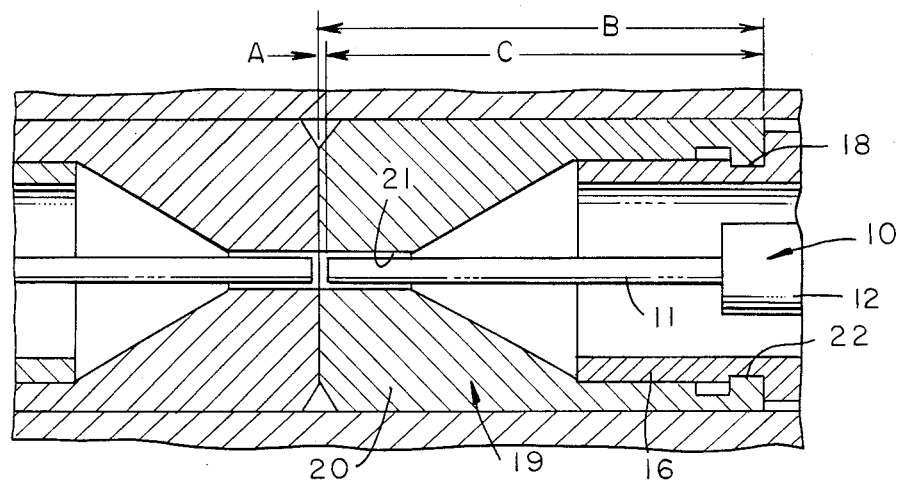
FIG. 3 is a side elevational, sectional, partially fragmentary view showing the ends of two optical fiber contacts abutting to achieve fiber connection.

With reference now to the drawings and particularly FIGS. 1 and 2, an optical fiber 10 with which the connector of this invention is most advantageously employed includes a glass or plastic clad O.D. 11 surrounded by a protective coating (buffer) 12 and a strength member 13 received thereover. Before mounting in the contact and other apparatus to be described, a portion of the strength material and protective coating is removed leaving a bare fiber core portion 11 at one end. A contact 14 for securing one of the fibers to be interconnected, includes a hollow tubular member or ferrule 15 constructed of a suitable material which can be laterally crimped for a purpose to be described, the outer end portions being turned down to form smaller diameter regions at each end enumerated generally as at 16 and 17. Furthermore, a circumferential recess 18 is formed on the reduced diameter region 16 immediately adjacent the shoulder defining the boundary between the reduced diameter region and the uniform diameter portion of the ferrule center part.

A cylindrical cap or tip 19 has one end wall 20, the other end being open. An opening 21 in the tip end wall colinear with the cylindrical axis of the part is to receive the bare fiber 11 therein in final assembly, and, therefore, the opening diameter will vary depending upon the size of the fiber to be accommodated. More particularly, the diameter of the opening 21 slightly exceeds the bare fiber diameter in order to precisely position the bare fiber therewithin but not impose any frictional restraint against movement of the fiber.

The open end of the tip 19 includes an inwardly directed circumferential flange 22 which is of such a dimension as to permit sliding receipt on the reduced diameter end 16 of the member 14. More particularly, when the tip is positioned on the ferrule smaller diametral part 16, the flange 22 snaps into the recess 18 securing the tip to the ferrule. That is, with the tip in place on the end of the tubular member or ferrule 15, the two parts are maintained in a rigid unitary relationship with the longitudinal axis of the tip opening 21 being precisely colinear with the longitudinal axis of the member 15. Also, the outer end surface of the tip is faced off at precisely 90 degrees to the tip longitudinal axis such that when aligned with another fiber contact, the two contact end faces can be brought into abutting relationship and the respective tip openings precisely aligned.

After the fiber is initially assembled in a contact 14, it is necessary to cleave the fiber at a point leaving the fiber end just inwardly of the tip outer end face. Also, the cleaved fiber must have a smooth mirror-like end face that is precisely 90-degrees to the fiber longitudinal axis. The fiber end spacing from the tip outer surface is shown as the dimension A in FIG. 3 which also equals B—C or preferably approximately equal to 0.0002 inches. Satisfactory fiber cleaveage can be achieved by using the apparatus and techniques disclosed in U.S. Pat. No. 4,530,452 assigned to the same assignee as this application.

A terminus body 23 is a hollow cylindrical affair of generally uniform outer diameter and having a bore 24 extending through substantially its complete length of a first diameter and reducing down to a smaller diameter portion at one end (front end) with a shoulder 25 therebetween. The dimensions of the two diametral portions of the internal bore of the terminus body are such that the aforedescribed contact 14 with tip 19 in place on being inserted from terminus the large diameter end can pass through the small diameter portion to extend outwardly therefrom. A flange 26 received on the contact abuts against the shoulder 25 within the terminus to positively determine the amount of extension of the contact from the terminus and provide a spring loading for the contacts to bring them into positive end abutting relation.

The various parts identified generally as 27 are substantially the same as those more fully described in U.S. patent application Ser. No. 704,275 assigned to the same assignee, and serve to terminate the strength member 13 providing strain relief for the fragile fiber. In addition, when the strength member termination means 27 is affixed onto the end of the terminus body, it has an end portion 28 which contacts a coil spring 29, the other end of which spring resiliently abuts against the flange 26. The coil spring provides resiliency to any axial movement of the contact within the terminus member to insure a positive end-abutting relation for a pair of mated contacts.

Although other means of utilization of the optical fiber connector of this invention may be made, in its most advantageous use the fiber connector is incorporated within the plug and receptacle parts of an electrical connector housing such as those manufactured by the assignee of the present application. Briefly, when used for interconnecting cable wires, such a connector includes a cylindrical shell plug which receives a cylindrical receptacle shell therewithin to releasably mate pin and socket contacts that are individually soldered or crimped to a cable wire. As shown partially in FIG. 1, a receptacle part 30 can be releasably mated to a plug part 31 to join a pair of contacts 14 with included fibers in a manner producing a high efficiency light transmission junction between the ends of the fibers. More particularly, the entire contact assembly consisting of a contact, terminus body and strength member termination means with included fiber is through an opening in the receptacle so as to extend outwardly from the receptacle mating face 32. A further assembly of contact terminus body and strength member termination means with included fiber is mounted within an opening in the plug 33, the outer end portion of the plug contact being located within an alignment sleeve 34. Now, when the plug and receptacle parts are joined together or mated, the contact carried by the receptacle is received within the opposite end of the alignment sleeve 34 bringing the two ends of the fiber carrying contacts together. When this is accomplished by means 34, the two bare fiber ends are maintained precisely colinear with their faced-off ends in a very slightly spaced relation thereby assuring optimal efficiency in light transmission across the junction.

A suitable alignment sleeve 34 for use in practicing the present invention is to be found disclosed in U.S. patent application Ser. No. 416,639, filed Sept. 10, 1982 and assigned to the same assignee as this application.

Figure 4:
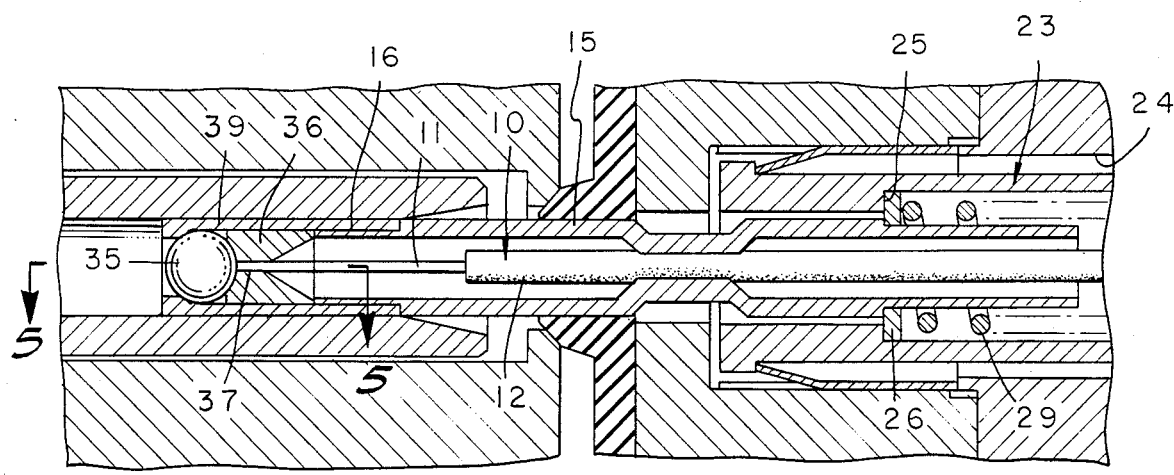
FIGS. 4 and 5 are side elevational, sectional views of an alternative embodiment.
Figure 5:
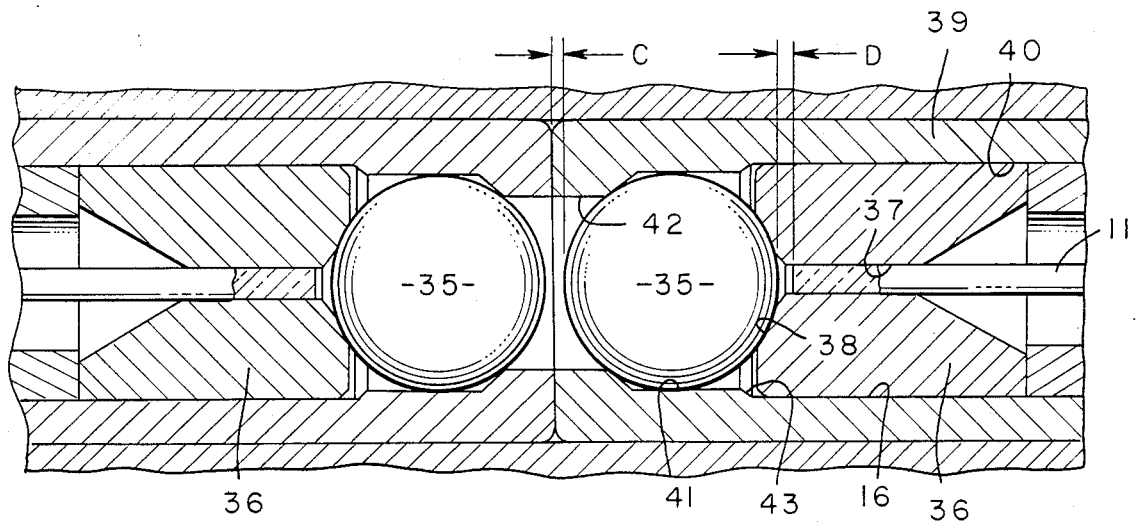

For the ensuing description of an alternative embodiment of the invention, reference is now made to FIGS. 4 and 5. As shown there, this embodiment has been modified to include a spherical lens 35 which are known to be advantageous in enhancing light transmission between a pair of contact-held fibers. Various of the contact assembly parts are identical to those of the first described embodiment, and, therefore, where identical parts will be given the same reference numeral. The tubular body or ferrule 15, may include the recess 18 as in the first described embodiment or it may be left out leaving a smooth uniform smaller diametral portion 16.

An end cap or insert 36 is a cylindrical member having an outer diameter identical to the ferrule smaller diametral portion 16. An opening 37 along the insert cylindrical axis has a diameter only very slightly larger than that of the bare fiber 11 so that the fiber may be positioned in the opening without experiencing bending or torsional forces. The outer end surface of the insert 36 is formed into a concavity 38 which is a conical opening for precise location of the spherical lens 35. Thus, the lens 35 on being received within the concavity 38 is positively located relative to the tip with a lens diameter and the axis of opening 37 being precisely colinear.

A lens holder 39 consists of a cylindrical body having an outer diameter slightly larger than that of ferrule 15. The holder has an axial bore including a first part 40 of a diameter enabling fitting receipt of the tip insert 36 and ferrule small diameter part 16 therewithin, a second part 41 of diameter smaller than 40 within which the spherical lens 35 can be snugly positioned, and an outlet opening 42 of a diameter less than 41.

An internal shoulder 43 between the first and second bore parts 40 and 41 is so located that when the lens holder 39 and spherical lens 35 are assembled onto a ferrule and tip so that the tip outer end face will be spaced from the shoulder insuring continuous precise location of the spherical lens with respect to both the outer end face of holder 39 and the faced-off fiber end (FIG. 5).

Preliminarily as in the first embodiment, the fiber must be cleaved to present a 90-degree end face which may be accomplished as previously referenced. The spacing D between the fiber end and the point of intersection of the fiber longitudinal axis with the lens surface is critical and is functionally related to the lens diameter. The distance C from the outermost lens end point to the plane of the holder outer surface is not as critical and precisely defined by the system optics as the distance D. The fiber end should abut with the lens (distance D=0) if the lens material has a refractive index 2.0.

In assembly and use, the fiber has its strength member secured by the parts 27, the extending protective coating is crimped within ferrule 15 and the tip insert 36 is located around the bare fiber. The holder 39 with included spherical lens 35 is then slid onto the tip insert and small diametral ferrule end simultaneously abutting the tip insert against the ferrule end and contactingly securing the spherical lens between the tip insert and inner end wall surfaces of the holder. Finally, the contact assembly is mounted within a connector part (receptacle or plug, as the case may be), and two such connector parts are mated which locates two contact assemblies in end contacting relation. The two fibers are now connected together, in that a light signal applied to one fiber is transmitted from the fiber end through two spherical lenses to be focussed onto the other fiber end.

In the practice of the described invention there is provided an optical fiber contact composed of a tubular ferrule part onto an end of which a caplike tip is releasably snapped. The tip has an opening for receiving a bare fiber end portion in fitting relation. This means that for each fiber size a tip with the appropriate sized opening must be used. The ferrule part of the contact remains the same for all fiber sizes resulting in a considerable savings in manufacturing costs over other styles of fiber contacts that must be manufactured differently in their entirety for varying fiber sizes.

I claim:

1. In an optical fiber connector having first and second contacts for respectively holding first and second optical fibers to be interconnected, each said fiber having a bare fiber end portion with a faced-off end, the improvement comprising:

each contact including a tubular member having a bore of sufficient cross-sectional dimensions as to enable receipt of an optical fiber therewithin, said tubular member being constructed of a malleable material and having a part laterally crimped to clampingly engage the optical fiber carried therewithin;

tip means releasably enclosing one end of the tubular member and having an opening therein colinear with the tubular member longitudinal axis and of cross-sectional dimensions slightly larger than the diameter of a bare optical fiber, and an outer end surface faced off at substantially 90° to the tip means opening;

said tip means being cylindrical with an axially extending generally cylindrical bore open at one end and having an end wall closing off the other end, an opening being formed in the end wall colinear with the tip means cylindrical axis, and an inwardly directed flange on the tip means bore wall being received in a groove on the tubular member; and a hollow terminus body within which the tubular member is resiliently mounted to extend outwardly of an end of the terminus body and a strength member termination means affixed to the other end of the terminus body, said terminus body having a bore extending therethrough with a first diameter region and a second diameter region smaller than the first diameter region, said tubular member other end portion being received through the hollow terminus body bore and including a washer of diameter greater than the second diameter region preventing withdrawal of the tubular member and coil spring means within the hollow terminus bore resiliently mounting the tubular member therewithin.

* * * * *